US010733984B2

(12) United States Patent
Loghmani et al.

(10) Patent No.: US 10,733,984 B2
(45) Date of Patent: Aug. 4, 2020

(54) MULTI-MODAL INTERFACE IN A VOICE-ACTIVATED NETWORK

(71) Applicant: Google LLC, Mountain View, CA (US)

(72) Inventors: Masoud Loghmani, Mountain View, CA (US); Anshul Kothari, Cupertino, CA (US); Ananth Devulapalli, San Jose, CA (US)

(73) Assignee: Google LLC, Mountain View, CA (US)

( * ) Notice: Subject to any disclaimer, the term of this patent is extended or adjusted under 35 U.S.C. 154(b) by 147 days.

(21) Appl. No.: 15/973,447

(22) Filed: May 7, 2018

(65) Prior Publication Data

US 2019/0341028 A1    Nov. 7, 2019

(51) Int. Cl.
*G10L 15/18*    (2013.01)
(52) U.S. Cl.
CPC ...... *G10L 15/1822* (2013.01); *G10L 15/1815* (2013.01)
(58) Field of Classification Search
USPC ............... 704/246, 247, 251, 252, 257, 275
See application file for complete search history.

(56) References Cited

U.S. PATENT DOCUMENTS

| 6,643,620 | B1 | 11/2003 | Contolini et al. |
| 6,889,191 | B2 | 5/2005 | Rodriguez et al. |
| 9,685,175 | B1* | 6/2017 | Durham ............... G10H 1/0008 |
| 2005/0267758 | A1* | 12/2005 | Shi ........................ G10L 13/10 |
| | | | 704/260 |
| 2007/0204319 | A1* | 8/2007 | Ahmad .............. H04N 21/4622 |
| | | | 725/134 |
| 2008/0046406 | A1 | 2/2008 | Seide et al. |
| 2008/0270139 | A1* | 10/2008 | Shi ......................... G10L 13/10 |
| | | | 704/260 |
| 2009/0190899 | A1 | 7/2009 | Bangalore |
| 2009/0299752 | A1 | 12/2009 | Rodriguez et al. |
| 2012/0293522 | A1* | 11/2012 | Ahmad .............. H04N 21/4622 |
| | | | 345/502 |

(Continued)

OTHER PUBLICATIONS

International Search Report and Written Opinion of the International Searching Authority for Appl. Ser. No. PCT/US2019/026345 dated Jul. 5, 2019 (20 pages).

(Continued)

*Primary Examiner* — Leonard Saint Cyr
(74) *Attorney, Agent, or Firm* — Foley & Lardner LLP; James De Vellis

(57) ABSTRACT

Systems and methods of the present technical solution enable a multi-modal interface for voice-based devices, such as digital assistants. The solution can enable a user to interact with video and other content through a touch interface and through voice commands. In addition to inputs such as stop and play, the present solution can also automatically generate annotations for displayed video files. From the annotations, the solution can identify one or more break points that are associated with different scenes, video portions, or how-to steps in the video. The digital assistant can receive input audio signal and parse the input audio signal to identify semantic entities within the input audio signal. The digital assistant can map the identified semantic entities to the annotations to select a portion of the video that corresponds to the users request in the input audio signal.

20 Claims, 5 Drawing Sheets

(56) References Cited

U.S. PATENT DOCUMENTS

| | | | |
|---|---|---|---|
| 2014/0222436 A1 | 8/2014 | Binder et al. | |
| 2015/0153906 A1 | 6/2015 | Liao et al. | |
| 2016/0098998 A1 | 4/2016 | Wang et al. | |
| 2016/0300020 A1* | 10/2016 | Wetta | G06Q 50/24 |
| 2016/0300154 A1* | 10/2016 | Bufe | G06F 17/2775 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Amazon, "Echo Look Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018, 6 pages.
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . .'", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Nieva, Richard, "Google Home and eBay can tell you how much that's worth", cnet, Mar. 8, 2017 (3 pages).
Novet, et al., "Amazon is getting ready to bring Alexa to wore", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Unknown Author, "'Dolphin' attacks fool Amazon, Google voice assistants", BBC News, Sep. 7, 2017, 8 pages.

(56) References Cited

OTHER PUBLICATIONS

Willens, Max, "For publishers, Amazon Alexa holds promise but not much money (yet)", Digiday, Jul. 6, 2017 (6 pages).

* cited by examiner

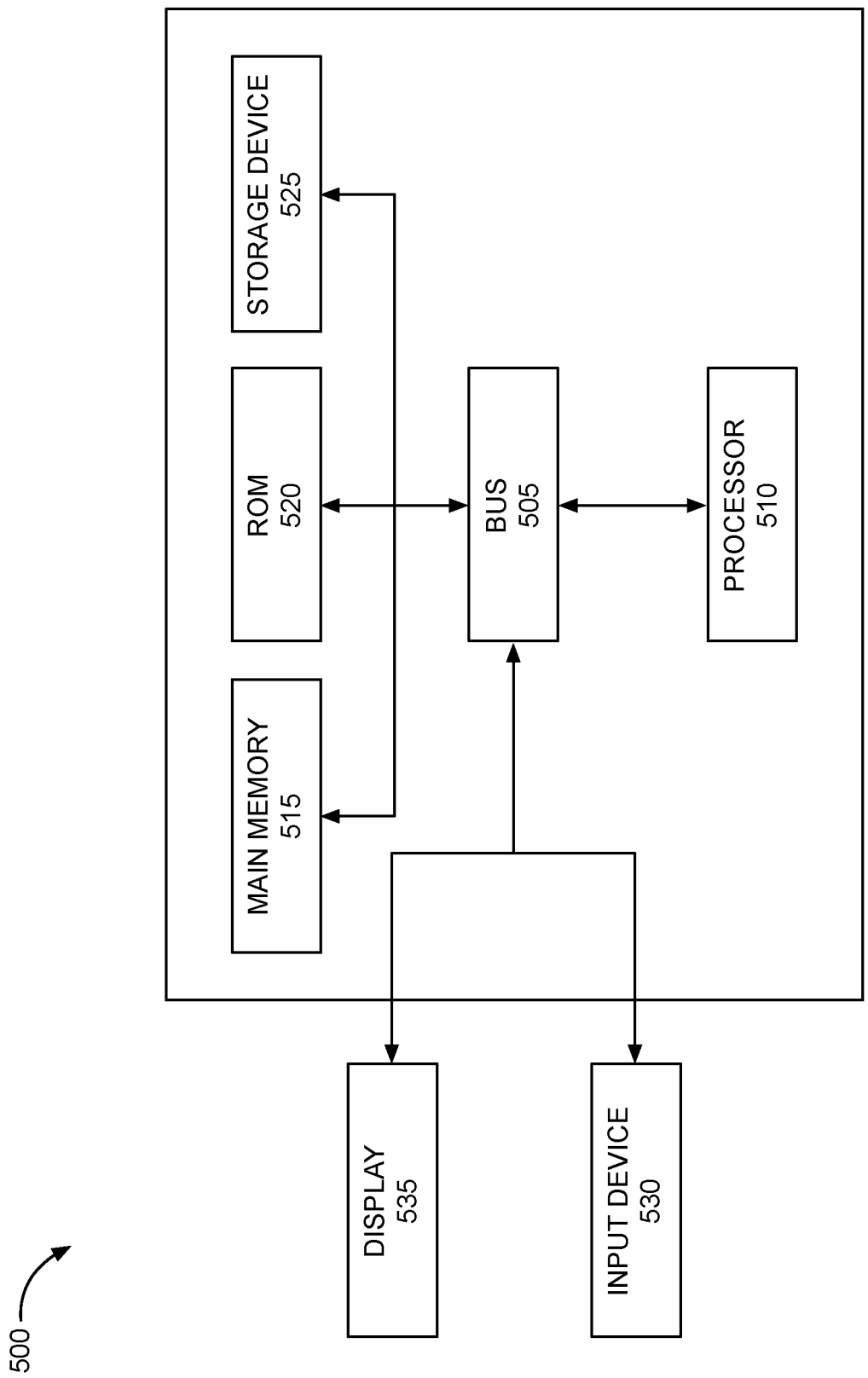

MULTI-MODAL INTERFACE IN A VOICE-ACTIVATED NETWORK

BACKGROUND

Computing devices can provide digital content to networked client devices. Excessive network transmissions may be required to find specific location or content within the provided digital content. Additional, voice-based interfaces may not be capable of moving to specific locations within the digital content, which can result in wasted network resources as the entity of the digital content is transmitted to the network client device.

SUMMARY

According to at least one aspect of the disclosure, a system to control digital components in a voice-activated system can include a data processing system. The data processing system can include one or more processors and a memory. The data processing system can execute a natural language processor ("NLP") component, an annotation component, and a parsing component. The natural language processor component can receive a first input audio signal that is detected by a sensor at a client computing device. The natural language processor component can parse the first input audio signal to identify a first digital component request in the first input audio signal. The annotation component can generate a first set of annotations of the first digital component based at least on speech recognized in the first digital component. The parsing component can identify a plurality of break points based on at least the first set of annotations. The natural language processor component can receive a second input audio signal that is detected by the sensor at the client computing device. The natural language processor component can parse the second input audio signal to identify a term in the second input audio signal. The parsing component can select a break point from the plurality of break points based on the term. The parsing component can transmit a portion of the first digital component corresponding to the break point.

According to at least one aspect of the disclosure, a method to control digital components in a voice-activated system can include receiving, by a natural language processor component executed by a data processing system and via an interface of the data processing system, a first input audio signal detected by a sensor at a client computing device. The method can include parsing, by the natural language processor component, the first input audio signal to identify a first digital component request in the first input audio signal. The method can include generating, by an annotation component executed by the data processing system, a first set of annotations of the first digital component based at least on speech recognized in the first digital component. The method can include identifying, by a parsing component executed by the data processing system, a plurality of break points based on at least the first set of annotations. The method can include receiving, by natural language processor component, a second input audio signal detected by the sensor at the client computing device. The method can include parsing, by the natural language processor component, the second input audio signal to identify a term in the second input audio signal. The method can include selecting, by the parsing component, a break point from the plurality of break points based on the term. The method can include transmitting, by the parsing component to the client computing device, a portion of the first digital component corresponding to the break point.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 illustrates a block diagram of an example computer system, in accordance with an example of the present disclosure.

DETAILED DESCRIPTION

Following below are more detailed descriptions of various concepts related to, and implementations of, methods, apparatuses, and systems of transferring data in a secure processing environment. The various concepts introduced above and discussed in greater detail below may be implemented in any of numerous ways.

The present disclosure is generally directed controlling digital components in a voice-activated system. Interfaces for presenting video can include inputs that mimic electro-mechanical playback devices (e.g., VCRs), and include buttons such as stop, play, fast forward, and rewind. Interacting with these limited inputs with a voice-activated system can be difficult. Additionally, the difficulty in interacting with the video content make it difficult for users to select and watch only portions of video content. Difficulty in finding and watching only the desired portions of video content can result in computational and network waste as the end user may often watch or download the whole video content rather than only the needed portions.

Systems and methods of the present technical solution enable a multi-modal interface for voice-based devices, such as digital assistants. The solution can enable a user to interact with video and other content through a touch interface and through voice commands. In addition to inputs such as stop and play, the present solution can also automatically generate annotations for displayed video files. From the annotations, the solution can identify one or more break points that are associated with different scenes, video portions, or how-to steps in the video. The digital assistant can receive input audio signal and parse the input audio signal to identify semantic entities within the input audio signal. The digital assistant can map the identified semantic entities to the annotations to select a portion of the video that corresponds to the users request in the input audio signal. The digital assistant can then jump to the selected portion of the video. Enabling the user of a voice-based digital assistant to search for specific content within a video can reduce computational and network resources by enabling users to skip to the requested portion of the video, enabling only portions of the video to be transmitted over the network rather than the whole video. The present solution also provides the user with a new interface for interacting in with video on voice-based devices.

Figure 1:
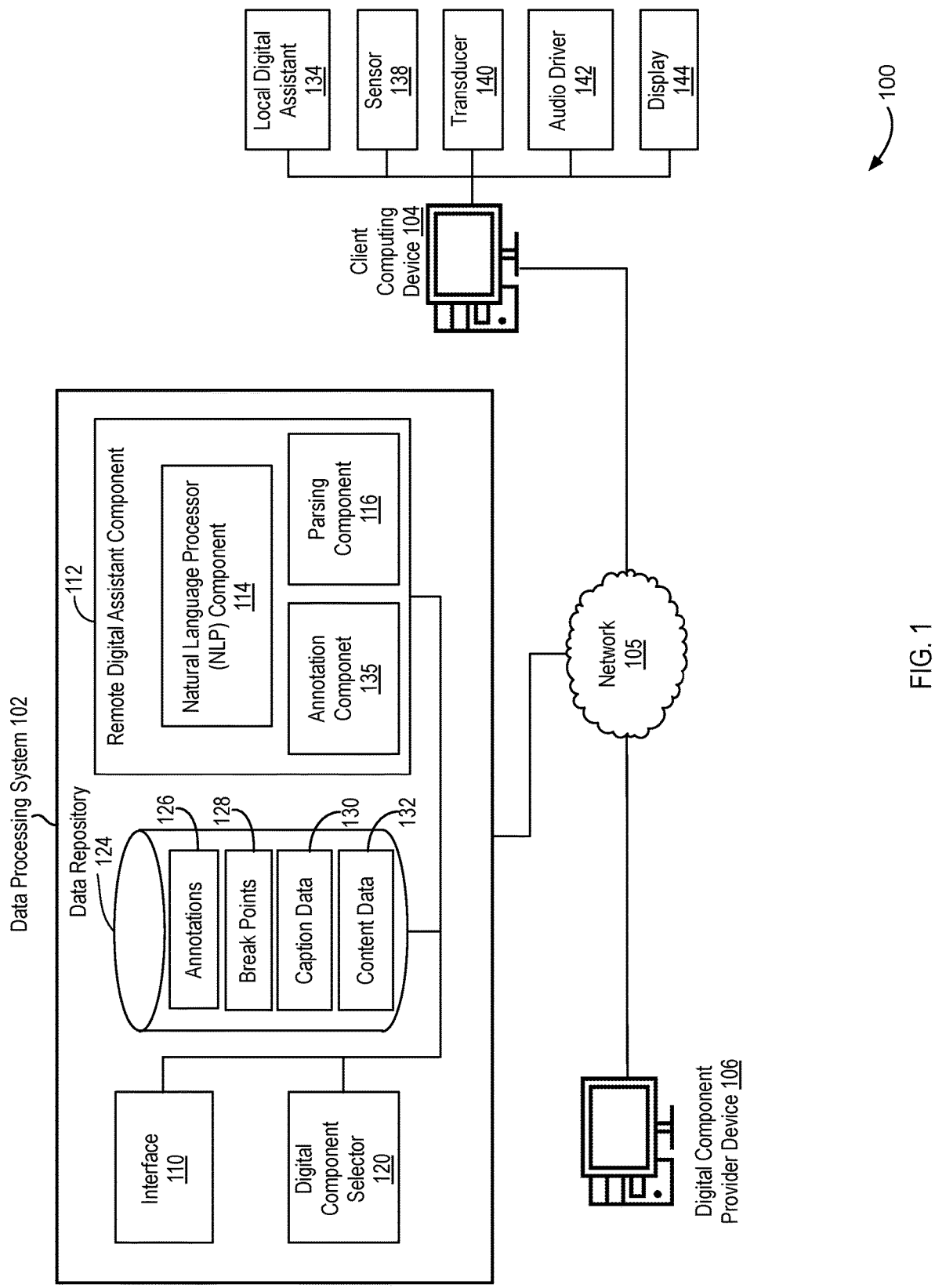
FIG. 1 illustrates an example system to control digital components in a voice-activated system, in accordance with an example of the present disclosure.

FIG. 1 illustrates an example system 100 to control digital components in a voice-activated system. The system 100 can include a digital component selection infrastructure. The system 100 can include a data processing system 102. The data processing system 102 can communicate with one or more of a digital component provider device 106 (e.g., content provider device) or client computing devices 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, digital assistant, personal digital assistant, smartwatch, wearable device, smart phone, portable computers, or speaker. For example, via the network 105 a user of the client computing device 104 can access information or data provided by a digital component provider device 106. The client computing device 104 may or may not include a display. For example, the client computing device 104 may include limited types of user interfaces, such as a microphone and speaker (e.g., the client computing device 104 can include a voice-drive or audio-based interface). The primary user interface of the computing device 104 may be a microphone and speaker.

The network 105 can include or constitute a display network, e.g., a subset of information resources available on the internet that are associated with a content placement or search engine results system, or that are eligible to include third party digital components. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the digital component provider device 106.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example, with the computing device 104 or the digital component provider device 106. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The client computing device 104 can include, execute, interface, or otherwise communicate with one or more of at least one local digital assistant 134, at least one sensor 138, at least one transducer 140, at least one audio driver 142, or at least one display 144. The sensor 138 can include, for example, a camera, an ambient light sensor, proximity sensor, temperature sensor, accelerometer, gyroscope, motion detector, GPS sensor, location sensor, microphone, video, image detection, or touch sensor. The transducer 140 can include or be part of a speaker or a microphone. The audio driver 142 can provide a software interface to the hardware transducer 140. The audio driver 142 can execute the audio file or other instructions provided by the data processing system 102 to control the transducer 140 to generate a corresponding acoustic wave or sound wave. The display 144 can include one or more hardware or software component configured to provide a visual indication or optical output, such as a light emitting diode, organic light emitting diode, liquid crystal display, laser, or display.

The local digital assistant 134 can include or be executed by one or more processors, logic array, or memory. The local digital assistant 134 can detect a keyword and perform an action based on the keyword. The local digital assistance 134 can be an instance of the remote digital assistance component 112 executed at the data processing system 102 or can perform any of the functions of the remote digital assistance component 112. The local digital assistant 134 can filter out one or more terms or modify the terms prior to transmitting the terms as data to the data processing system 102 (e.g., remote digital assistant component 112) for further processing. The local digital assistant 134 can convert the analog audio signals detected by the transducer 140 into a digital audio signal and transmit one or more data packets carrying the digital audio signal to the data processing system 102 via the network 105. The local digital assistant 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The local digital assistant 134 can perform a pre-filtering or pre-processing on the input audio signal to remove certain frequencies of audio. The pre-filtering can include filters such as a low-pass filter, high-pass filter or a bandpass filter. The filters can be applied in the frequency domain. The filters can be applied using digital signal processing techniques. The filter can be configured to keep frequencies that correspond to a human voice or human speech while eliminating frequencies that fall outside the typical frequencies of human speech. For example, a bandpass filter can be configured to remove frequencies below a first threshold (e.g., 70 Hz, 75 Hz, 80 Hz, 85 Hz, 90 Hz, 95 Hz, 100 Hz, or 105 Hz) and above a second threshold (e.g., 200 Hz, 205 Hz, 210 Hz, 225 Hz, 235 Hz, 245 Hz, or 255 Hz). Applying a bandpass filter can reduce computing resource utilization in downstream processing. The local digital assistant 134 on the computing device 104 can apply the bandpass filter prior to transmitting the input audio signal to the data processing system 102, thereby reducing network bandwidth utilization. However, based on the computing resources available to the computing device 104 and the available network bandwidth, it may be more efficient to provide the input audio signal to the data processing system 102 to allow the data processing system 102 to perform the filtering.

The local digital assistant 134 can apply additional pre-processing or pre-filtering techniques such as noise reduction techniques to reduce ambient noise levels that can interfere with natural language processor. Noise reduction techniques can improve accuracy and speed of the natural language processor, thereby improving the performance of the data processing system 102 and manage rendering of a graphical user interface provided via the display 144.

The client computing device 104 can be associated with an end user that enters voice queries as audio input into the client computing device 104 (via the sensor 138 or transducer 140) and receives audio (or other) output from the data processing system 102 or digital component provider device 106 to present, display, or render to the end user of the client computing device 104. The digital component can include a computer-generated voice that can be provided from the data processing system 102 or digital component provider device 106 to the client computing device 104. The client computing device 104 can render the computer-generated voice to the end user via the transducer 140 (e.g., a speaker). The computer-generated voice can include recordings from a real person or computer-generated language. The client computing device 104 can provide visual output via a display device 144 communicatively coupled to the computing device 104.

The end user that enters the voice queries to the client computing device 104 can be associated with multiple client computing devices 104. For example, the end user can be associated with a first client computing device 104 that can be a speaker-based digital assistant device, a second client computing device 104 that can be a mobile device (e.g., a smartphone), and a third client computing device 104 that can be a desktop computer. The data processing system 102 can associate each of the client computing devices 104 through a common login, location, network, or other linking data. For example, the end user may log into each of the client computing devices 104 with the same account user name and password.

The client computing device 104 can receive an input audio signal detected by a sensor 138 (e.g., microphone) of the computing device 104. The input audio signal can include, for example, a query, question, command, instructions, or other statement provided in a language. The input audio signal can include an identifier or name of a third-party (e.g., a digital component provider device 106) to which the question or request is directed.

The client computing device 104 can include, execute, or be referred to as a digital assistant device. The digital assistant device can include one or more components of the computing device 104. The digital assistant device can include a graphics driver that can receive display output from the data processing system 102 and render the display output on display 132. The graphics driver can include hardware or software components that control or enhance how graphics or visual output is displayed on the display 144. The graphics driver can include, for example, a program that controls how the graphic components work with the rest of the computing device 104 (or digital assistant). The local digital assistant 134 can filter the input audio signal to create a filtered input audio signal, convert the filtered input audio signal to data packets, and transmit the data packets to a data processing system comprising one or more processors and memory.

The digital assistant device can include an audio driver 142 and a speaker component (e.g., transducer 140). The pre-processor component 140 receives an indication of the display output and instructs the audio driver 142 to generate an output audio signal to cause the speaker component (e.g., transducer 140) to transmit an audio output corresponding to the indication of the display output.

The system 100 can include, access, or otherwise interact with at least digital component provider device 106. The digital component provider device 106 can include one or more servers that can provide digital components to the client computing device 104 or data processing system 102. The digital component provider device 106 or components thereof can be integrated with the data processing system 102 or executed at least partially by the data processing system 102. The digital component provider device 106 can include at least one logic device such as a computing device having a processor to communicate via the network 105, for example with the computing device 104, the data processing system 102, or the digital component provider device 106. The digital component provider device 106 can include at least one computation resource, server, processor, or memory. For example, the digital component provider device 106 can include a plurality of computation resources or servers located in at least one data center.

A digital component provider device 106 can provide audio, visual, or multimedia-based digital components for presentation by the client computing device 104 as an audio output digital component, visual output digital components, or a mix thereof. The digital component can be or include a digital content. The digital component can be or include a digital object. The digital component can include subscription-based content or pay-for content. A digital component can include a plurality of digital content items. For example, a digital component can be a data stream from a streaming music service (e.g., the digital component provider device 106). The digital components can include or can be digital movies, websites, songs, applications (e.g., smartphone or other client device applications), or other text-based, audio-based, image-based, or video-based content. For example, the digital components can be how-to videos, movies, or other video provided by the digital content provider device 106 to the client computing device 104. The digital content provider device 106 can provide digital components generated by the digital content provider device 106, uploaded by users, or sources from other digital content provider devices 106.

The digital component provider device 106 can provide the digital components to the client computing device 104 via the network 105 and bypass the data processing system 102. The digital component provider device 106 can provide the digital component to the client computing device 104 via the network 105 and data processing system 102. For example, the digital component provider device 106 can provide the digital components to the data processing system 102, which can store the digital components and provide the digital components to the client computing device 104 when requested by the client computing device 104.

The data processing system 102 can include at least one computation resource or server. The data processing system 102 can include, interface, or otherwise communicate with at least one interface 110. The data processing system 102 can include, interface, or otherwise communicate with at least one remote digital assistant component 112. The remote digital assistant component 112 can include, interface, or otherwise communicate with at least one natural language processor component 114. The data processing system 102 can include, interface, or otherwise communicate with at least one digital component selector 120. The data processing system 102 can include, interface, or otherwise communicate with at least one annotation component 135. The data processing system 102 can include, interface, or otherwise communicate with at least one parsing component 116. The data processing system 102 can include, interface, or otherwise communicate with at least one data repository 124. The at least one data repository 124 can include or store, in one or more data structures or databases, sets of annotations 126, break points 128, caption data 130, and content data 132. The data repository 124 can include one or more local or distributed databases, and can include a database management The interface 110, remote digital assistant component 112, the natural language processor component 114, the digital component selector 120, the annotation component 135, and the parsing component 116 can each include at least one processing unit or other logic device such as programmable logic array engine, or module configured to communicate with the database repository or database 124. The interface 110, the remote digital assistant component 112, the natural language processor component 114, the digital component selector 120, the annotation component 135, the parsing component 116, and the data repository 124 can be separate components, a single component, or part of multiple data processing systems 102. The system 100 and its components, such as a data processing system 102, can include hardware elements, such as one or more processors, logic devices, or circuits.

The data processing system 102 can include an interface 110. The interface 110 can be configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script, or program installed at the client computing device 104, such as a local digital assistant 134 to communicate input audio signals to the interface 110 of the data processing system 102 and to drive components of the client computing device to render output audio signals or visual output. The data processing system 102 can receive data packets, a digital file, or other signals that include or identify an input audio signal (or input audio signals). The computing device 104 can detect the audio signal via the transducer 140 and convert the analog audio signal to a digital file via an analog-to-digital converter. For example, the audio driver 142 can include an analog-to-digital converter component. The pre-processor component 140 can convert the audio signals to a digital file that can be transmitted via data packets over network 105.

The remote digital assistant component 112 of the data processing system 102 can execute or run an NLP component 114 to receive or obtain the data packets including the input audio signal detected by the sensor 138 of the computing device 104. The client computing device 104 can also execute an instance of the client computing device 104 to process language and text at the client computing device 104. The data packets can provide a digital file. The NLP component 114 can receive or obtain the digital file or data packets comprising the audio signal and parse the audio signal. For example, the NLP component 114 can provide for interactions between a human and a computer. The NLP component 114 can be configured with techniques for understanding natural language and enabling the data processing system 102 to derive meaning from human or natural language input. The NLP component 114 can include or be configured with techniques based on machine learning, such as statistical machine learning. The NLP component 114 can utilize decision trees, statistical models, or probabilistic models to parse the input audio signal.

The NLP component 114 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), and semantic processing (e.g., processing that can occur after identifying a word and encoding its meaning in order to relate the identified word to other words with similar meanings). The NLP component 114 can identify semantic representations of the identified words. By identifying semantic representations, the data processing system can match words or phrases based on their similar semantic meanings rather than specific word matches. For example, a search of an input text based on semantic representations can return the synonyms to a searched word rather just the occurrences of only the searched word.

The NLP component 114 can convert the input audio signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 114 matches the text to words that are associated, for example via training across users or through manual specification, with actions that the data processing system 102 can serve. The NLP component 114 can convert image or video input to text or digital files. For example, the NLP component 114 can detect the speech in a video file, convert the speech into text, and then process the text. The NLP component 114 can identify or receive closed caption data in the video files and process the closed caption data to recognize the text or perform semantic analysis on the closed caption data. The NLP component 114 can store the closed caption data for each of the digital components as caption data 130 in the data repository 124. The NLP component 114 can convert the NLP component 114 can process, analyze, or interpret image or video input to perform actions, generate requests, or select or identify data structures.

The data processing system 102 can receive image or video input signals, in addition to, or instead of, input audio signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, or machine learning techniques can be collectively referred to as imaging techniques. The data processing system 102 (e.g., the NLP component 114) can be configured with the imaging techniques, in addition to, or instead of, audio processing techniques.

The NLP component 114 can obtain the input audio signal. From the input audio signal, the NLP component 114 can identify at least one request or at least one trigger keyword corresponding to the request. The request can indicate intent, digital components, or subject matter of the input audio signal. The trigger keyword can indicate a type of action likely to be taken. For example, the NLP component 114 can parse the input audio signal to identify at least one request to skip to a specific part of a video file. The trigger keyword can include at least one word, phrase, root or partial word, or derivative indicating an action to be taken. For example, the trigger keyword "go," "go to," or "skip" to indicate the end user wants to view a specific portion of the video file.

The NLP component 114 can parse the input audio signal to identify, determine, retrieve, or otherwise obtain a request for digital components. The digital components can be video-based files, such as streaming movies, shows, or other video files. For instance, the NLP component 114 can apply a semantic processing technique to the input audio signal to identify the requested digital component. The NLP component 114 can apply the semantic processing technique to the input audio signal to identify a trigger phrase that includes one or more trigger keywords, such as a first trigger keyword and a second trigger keyword. For example, the input audio signal can include the sentence "Play a video of fixing a bike." The NLP component 114 can determine that the input audio signal includes a trigger keyword "play." The NLP component 114 can determine that the request is for a digital component (e.g., a video) of a bike being fixed.

The remote digital assistant component 112 of the data processing system 102 can execute or run an instance of the annotation component 135 to generate sets of annotations for digital components. The annotation component 135 can generate sets of annotations for the digital components that are transmitted to the client computing device 104 for presentations. An annotation set can include one or more annotations for the whole digital component (e.g., video file) or one or more annotations for each of the scenes or steps identified in the digital component. The parsing component 116 can use the annotation sets to determine the meaning, semantic meaning, or connect contained within the digital component or scene of the digital component. The parsing component 116 can use the annotation sets to match requests in input audio signals to the scenes or steps identified in a digital component. The annotation component 135 can store the annotations as annotation sets 126 in the data repository. The annotation sets 126 can be stored in a data structure or database that identifies the digital component, break point, scene, video portion, or any combination thereof with which the annotation set 126 is associated.

The annotation component 135 can generate a set of annotations based on speech recognized or text recognized in the digital component. For example, the digital component can be a video and the NLP component 114 can extract and process the speech from the video. Based on the speech content of the video, the annotation component can determine the content of the video and flag keywords. For example, in a how-to video the annotation component can flag the names of tools or specific materials. In this example, if the end user provides the input audio signal "what tools do I need to perform this task" when watching the how-to video, using the annotations, the data processing system can present the portion of the how-to video where the video discusses tools to the end user. The annotation component 135 can generate a set of annotations based on the closed caption data associated with the digital component. The set of annotation can include a list of the words spoken during the digital component or a portion thereof. The parsing component 116 can perform keyword searches to match keywords identified in an input audio signal with the terms spoken during the digital component or portion thereof. The set of annotations can include a semantic meaning or representation of the terms or phrases in the digital component. The set of annotations can indicate a semantic meaning for each scene or portion of the digital component.

The annotation component 135 can generate a set of annotations based on images in the digital component. The annotation component 135 can extract frames or image from an image-based or video-based digital component. The annotation component 135 can perform image recognition on the images. The set of annotations based on an image can include a database of objects identified in the digital component and the time point at which the identified object occurs in the digital component. The annotation component 135 can also detect transitions in video-based digital components. The transitions can be, for example, changes in scenes or fades to black. The transitions can denote the change from a first scene to a second scene. The set of annotations can indicate what type of transition was identified in the digital component and the time point at which the transition occurred in the digital component.

The annotation component 135 can generate a set of annotations based on input from a second client computing device 104 or digital content provider device 106. For example, the digital component can be provided by a digital content provider device 106 or by an end user of the second client computing device 104. The provider of the digital component can annotate the digital component and transmit the annotations as a set of annotations to the data processing system 102. The set of annotations from the provider can include time points in the digital component that indicate the beginning of scenes or steps in a video, keywords, or tags assigned to different portions of the digital component, or the location of defined break points. For example, the owner or creator of the digital component (e.g., a video) can set the location of break points in the meta data of the digital component to identify each of the steps discussed in the digital component.

The remote digital assistant component 112 of the data processing system 102 can execute or run an instance of the parsing component 116 to parse the digital component into different portions based on the sets of annotations generated by the annotation component 135. Parsing the digital components can include dividing the digital component into separate digital components. For example, the parsing component 116 can divide a video into a plurality of smaller videos. Each of the smaller videos may include a single scene or step included in the original video. Parsing the digital components can include determining break points in the digital component. A portion of the digital component can be defined as between two break points (or the beginning of the file and a first break point for the first portion of the digital component and the end of the file and the last break point for the last portion of the digital component). The parsing component 116 can set the break points based on the sets of annotations. For example, the parsing component 116 can set the break points at the transition between scenes. The parsing component 116 can set a plurality of break points within a single scene. For example, a single scene may cover a single topic in a how-to video. The portion of the how-to video containing the scene of the single topic can be defined by two break points. The parsing component 116 can also include a plurality of break points within the scene that indicate different steps taken during the scene. The parsing component 116 can set the break points using machine learning and natural language processing to identify locations in the digital components that may correspond to different steps in a video, transitions in a video, or useful phrases. For example, the parsing component 116 can identify annotations that may be helpful or identifiable in the digital component, such as a listing of ingredients, a listing of tools, or a specific type of scene (e.g., a car chase scene), and set break points at those locations. The parsing component 116 can also set the break points based on viewing history of the digital component. For example, if only a subportion of a video is typically viewed by users, the parsing component 116 can identify the subportion as an important or relevant portion of the video and can set a break point near the beginning of the subportion. The parsing component 116 can determine or identify each of the break points for a digital component. The parsing component 116 can save the break points as break points 128 in the data repository 124. The break points 128 can be a database that stores the time points of each of the break points in association with an indication of the digital component. The break points can be set at set intervals within the digital component. For example, the parsing component 116 can set a break point every 5, 10, 15, 20, 25, 30, or 60 minutes of the digital component.

The digital component selector 120 can select a digital component that includes text, strings, characters, video files, image files, or audio files that can be processed by the client computing device 104 and presented to the user via the display 144 or the transducer 140 (e.g., speaker). The digital component selector 120 can select a digital component that is responsive to the request identified by the NLP component 114 in the input audio signal. For a given request, the digital component selector 120 can select supplemental digital components that can also be provided with a primary digital component. The primary digital component can be a digital component directly selected responsive to a request. For example, the primary digital component can be the how-to video requested by the user. The supplemental digital components can be an additional digital component that provide additional information or are related to the primary digital component.

The digital component selector 120 can select which digital component provider device 106 should or can fulfill the request and can forward the request to the digital component provider device 106. For example, the data processing system 102 can initiate a session between the digital component provider device 106 and the client computing device 104 to enable the digital component provider device 106 to transmit the digital component to the client computing device 104. The digital component selector 120 can request digital component from the digital component provider device 106. The digital component provider device 106 can provide digital components to the data processing system 102, which can store the digital components in the data repository 124. Responsive to a request for a digital component, the digital component selector 120 can retrieve the digital component from the data repository 124. In response to a request for a digital component, the digital component selector 120 can select a portion or all of a digital component to provide the client computing device 104 in response to the request.

The digital component selector 120 can select multiple digital components via a real-time content selection process. The digital component selector 120 can score and rank the digital components and provide multiple digital components to the output merger component 120 to allow the output merger component 120 to select the highest ranking digital component. The digital component selector 120 can select one or more additional digital components that are transmitted to a second client computing device 104 based on an input audio signal (or keywords and requests contained therein). In one example, the input audio signal can include a request to start a streaming how-to video. The digital component selector 120 can select additional digital components (e.g., ads). The additional digital components can be transmitted to the client computing device 104 as the digital component selector 120 streams the how-to video to the client computing device 104. The additional digital components can inform an end user of additional or related digital component provider devices 106 that could fulfill the request from the first client computing device 104.

The digital component selector 120 can provide the selected digital component selected in response to the request identified in the input audio signal to the computing device 104 or local digital assistant 134 or application executing on the computing device 104 for presentation.

Thus, the digital component selector 120 can receive the content request from the client computing device 104, select, responsive to the content request, a digital component, and transmit, to the client computing device 104, the digital component for presentation. The digital component selector 120 can transmit, to the local digital assistant 134, the selected digital component for presentation by the local digital assistant 134 itself or a third-party application executed by the client computing device 104. For example, the local digital assistant 134 can play or output an audio signal corresponding to the selected digital component.

The data repository 124 store content data 132 that can include, for example, digital components provided by a digital component provider device 106 or obtained or determined by the data processing system 102 to facilitate content selection. The content data 132 can include, for example, digital components (or digital component object) that can include, for example, a content item, an online document, audio, images, video, multimedia content, or third-party content. The digital component provider device 106 can provide full-length digital components to the data processing system 102 to store as content data 132. The digital component provider device 106 can provide portions of the digital components to the data processing system 102.

Figure 2:
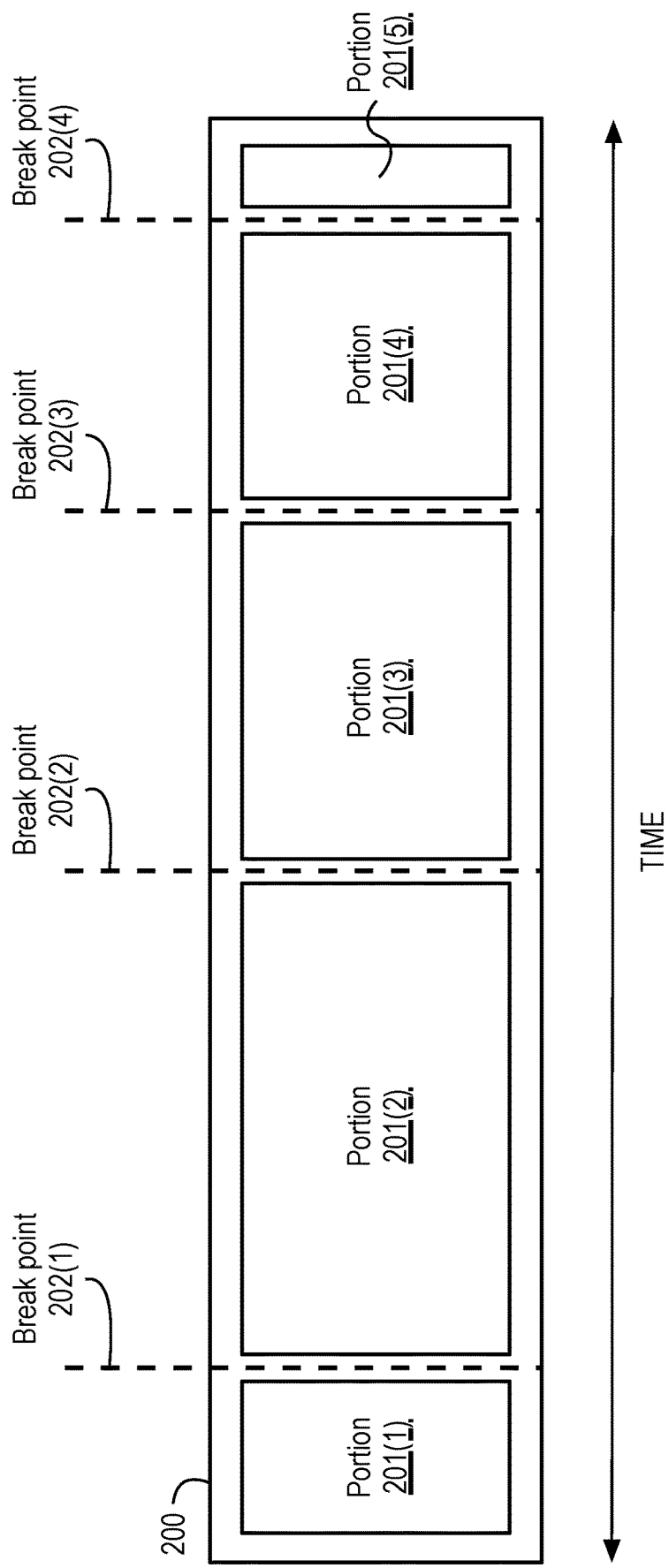
FIG. 2 illustrates a block diagram of an example representation of a digital component over time, in accordance with an example of the present disclosure.

FIG. 2 illustrates a block diagram of an example representation of digital component 200 over time. The digital component 200 can be a video-based digital component, such as a how-to video. The data processing system can identify a plurality of portions 201(1)-201(5), which can generally be referred to as portions 201. The data processing system can identify a plurality of break points 202(1)-202(4), which can generally be referred to as break points 202. The data processing system can also define a break point 202 at the beginning and at the end of the digital component.

Each of the portions 201 can be defined between two break points 202. For example, portion 201(2) is defined as the time between break point 202(1) and break point 202(2). The data processing system can select the time at which each of the break points 202 located based on the sets of annotations generated by the annotation component. The break point 202(1) may correspond to the start of an instructional portion of the digital component 200. The break point 202(2) may correspond to a first how-to step of the digital component 200.

Figure 3:
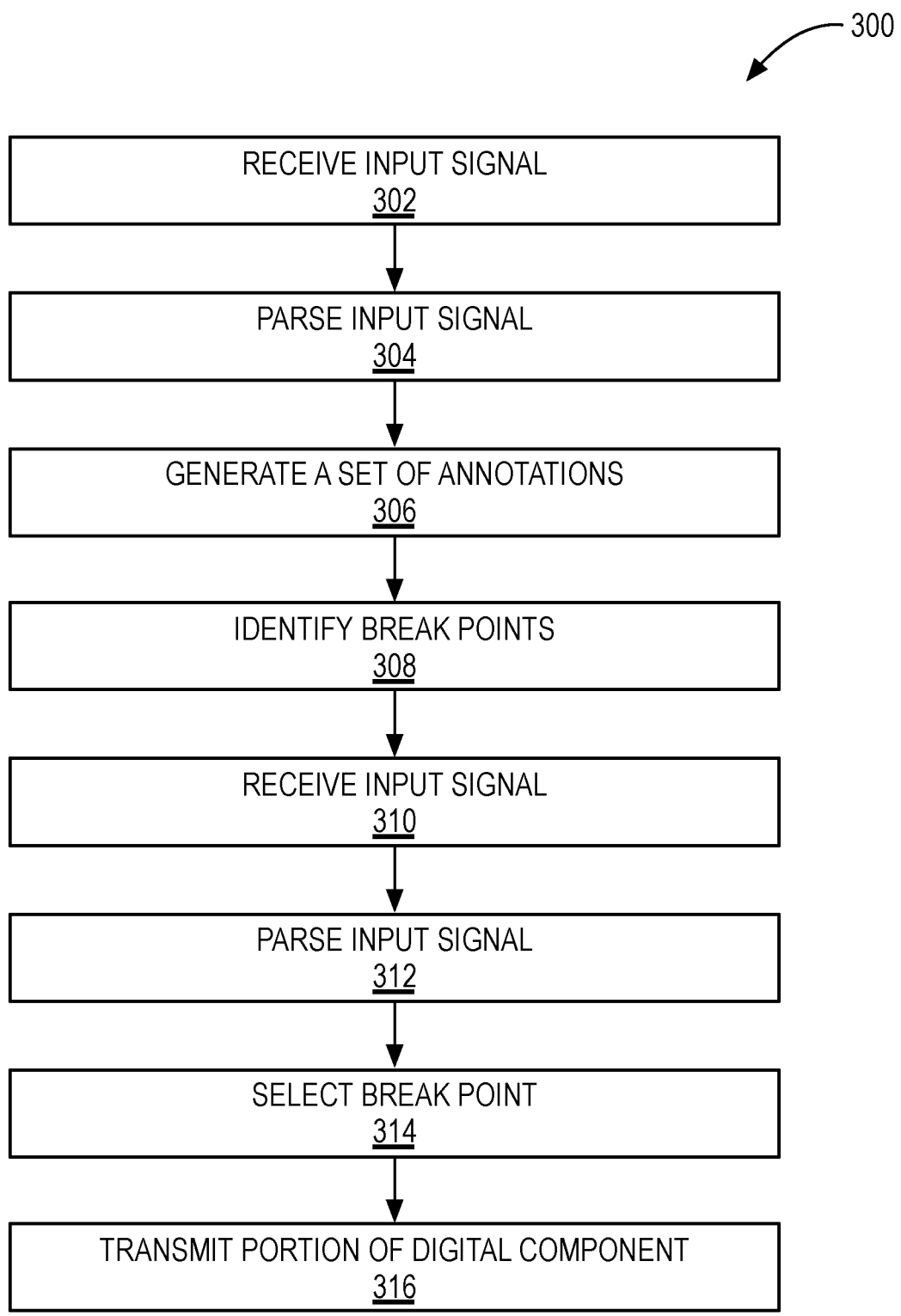
FIG. 3 illustrates a block diagram of an example method to control digital components in a voice-activated system, in accordance with an example of the present disclosure.

FIG. 3 illustrates a block diagram of an example method 300 to control digital components in a voice-activated system. The method 300 can include receiving an input signal (ACT 302). The method 300 can include parsing the input signal (ACT 304). The method 300 can include generating a set of annotations (ACT 306). The method 300 can include identifying break points (ACT 308). The method 300 can include receiving an input signal (ACT 310) and parsing the input signal (ACT 312). The method 300 can include selecting a break point (ACT 314). The method 300 can include transmitting a portion of a digital component (ACT 316).

As set forth above, the method 300 can include receiving an input signal (ACT 302). The method 300 can include receiving, by a natural language processor component executed by a data processing system, the input signal. The input signal can be an input audio signal that is detected by a sensor at a first client device. The sensor can be a microphone of the first client device. For example, a digital assistant component executed at least partially by a data processing system that includes one or more processors and memory can receive the input audio signal. The input audio signal can include a conversation facilitated by a digital assistant. The conversation can include one or more inputs and outputs. The conversation can be audio-based, text-based, or a combination of audio and text. The input audio signal can include text input, or other types of input that can provide conversational information. The data processing system can receive the audio input for a session corresponding to the conversation. The data processing system can receive the audio input in one or more portions or as a bulk or batch upload (e.g., multiple portions of the conversations uploaded in a single transmission to reduce the number of transmissions).

The method 300 can include parsing the input signal (ACT 304). The NLP component of the data processing system can parse the input signal to identify a digital component request. The NLP component can identify a trigger keyword in the input signal. For example, the input audio signal can include "OK, show me how to fix my bike." The NLP component can parse the input signal to determine the request is for a how-to video showing how to fix a bike. The NLP component can determine that the trigger keyword is to play, which can indicate that the end user wants to start streaming and playing the video to the client computing device. The client computing device can also provide the digital component request to the data processing system in a text form. For example, the end user can use a physical or digital keyboard associated with the client computing device to type a request for a specific video or other file.

Figure 4:
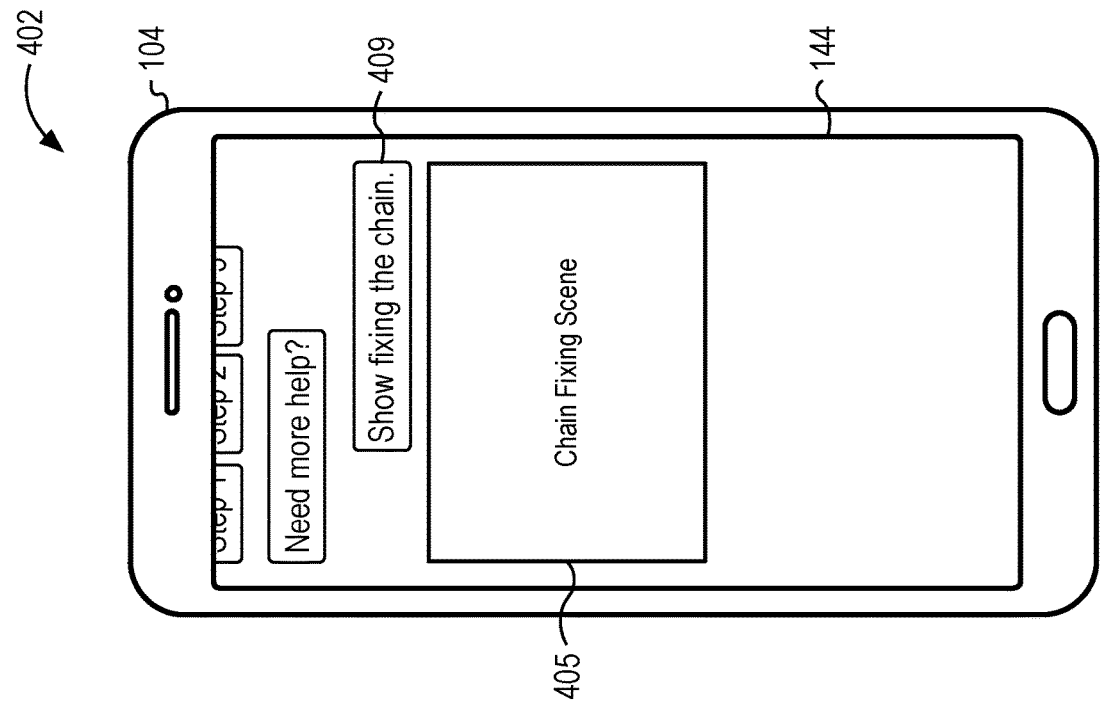
FIG. 4 illustrates a client computing device at a first point in time and during a second point in time during the method illustrated in FIG. 3, in accordance with an example of the present disclosure.
Figure 4:
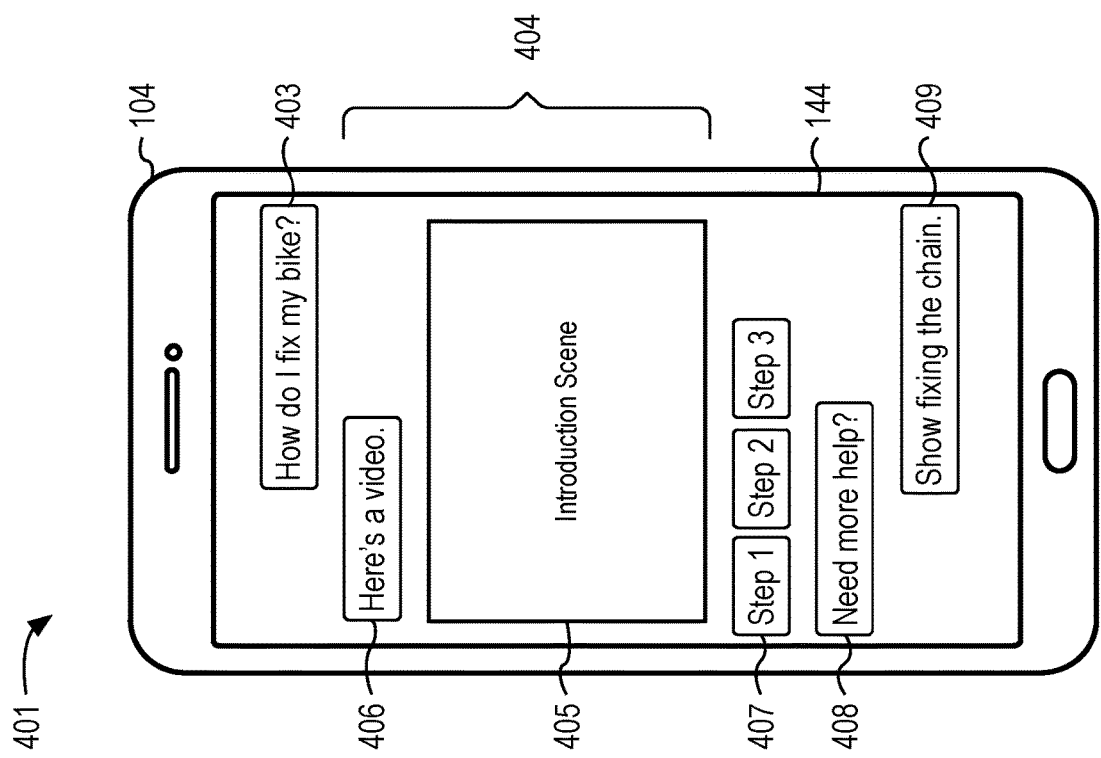

Also referring to FIG. 4, among others, FIG. 4 illustrates a client computing device 104 at a first point in time 401 and during a second point in time 402 during the acts of the method 300. The client computing devices 104 illustrated in FIG. 4 illustrates an example user interface that is presented to an end user on the display 144. The user interface is a conversational, voice-based interface. For example, inputs from the user are displayed as starting toward the right side of the display 144 and inputs (or responses) from the data processing system are displayed starting toward the left side of the display 144. New inputs or responses are added to the bottom of the conversation—near the bottom of the display 144. As the new inputs or responses are added, the older inputs and responses are scrolled toward the top of the display 144. For example, at time 402 a portion of the inputs visible at time 401 have been scrolled off the visible portion of the display 144.

As illustrated in FIG. 4, the client computing device 104 can detect an input audio signal that includes the phrase "how do I fix my bike?" The input audio signal can be processed by the NLP component 114 to extract the text of the input audio signal. The text 403 of the input audio signal can be displayed to the user as confirmation that the client computing device 104 (and data processing system 102) understood and correctly processed the input audio signal. The data processing system can select a digital component 404 in response to the request identified in the input audio signal. In the example illustrated in FIG. 4, the digital component 404 includes a video component 405 and a text component 406.

The method 300 can include generating a set of annotations (ACT 306). The annotation component 135 can generate one or more sets of annotations for the selected digital component. The NLP component 114 can process the speech contained in the digital component or closed caption data in or associated with the digital component to generate one or more of the sets of annotations. The annotation component 135 can generate one or more sets of annotations based on objects identified in the digital component. For example, the data processing system 102 can perform object recognition on the video frames in the digital component to identify objects in the digital component. The annotation component 135 can generate a set of annotations based on transitions (e.g., video fade ins or video fade outs) within the digital component. The NLP component 114 can generate semantic representations of the speech or text within the digital component. The annotation component 135 can generate a set of annotations based on the semantic representations. The annotation component 135 can cluster the semantic representations together to determine which portions of the digital component are related to a specific topic or step. For example, for a digital component that is a how-to video of how to fix a bike, the annotation component 135 can use semantic representations to identify portions of the how-to video that illustrates the changing of a tire and portions of the how-to video that illustrates how to change the chain of the bike. The annotation component 135 can generate a set of annotations that indicates the time portion of the how-to video where tire changing is discussed and the portion of the how-to video where chain changing is discussed.

The method 300 can include identifying break points (ACT 308). The data processing system 102 can identify the break points based on one or more of the generated sets of annotations. The break points can identify the time points of key frames within the video. The break points can identify scene transitions, the start of each step in a how-to video, the points of interest in the video, the entrance or exit of objects into the video.

An indication of one or more of the break points can be transmitted to the client computing device 104. Also referring to FIG. 4, among others, the indication of the break points can be included in digital component 407 and transmitted to the client computing device 104. The client computing device 104 can render the digital component 407 to display a list or indication of the breakpoints the data processing system 102 determined are present in the video component 405. The annotation component 135 can generate a label for each of the break points. For example, as illustrated in FIG. 4, the data processing system 102 transmitted a digital component to the client computing device 104 that included an indication of three break points. The break points were labeled "Step 1," "Step 2," and "Step 3," and can correspond to a starting time point of step 1, step 2, and step 3, respectively, in the video component 405.

The method 300 can also include the data processing system 102 selecting one or more supplemental or additional digital components in addition to the primary digital component identified in response to the input audio signal. For example, the supplemental digital components can be related to the same topic, provide additional information related to the primary digital component, or can prompt the end user for more input. Also referring to FIG. 4, among others, the data processing system 102 selected and transmitted an additional digital component 408 to the client computing device 104. The client computing device 104 can render and present the additional digital component 408 with the primary digital component 404. The additional digital component 308 can be an ad for a service provider or content related to the digital component 404.

The method 300 can include receiving an input signal (ACT 310). The input signal can be a second input audio signal. The second input audio signal can be detected by the sensor (e.g., microphone) of the client computing device 104. The method 300 can include parsing the input signal (ACT 312). The NLP component 114 can parse the second input audio signal to identify a keyword, term, or semantic representation within the second input audio signal. For example, and also referring to FIG. 4, the second input audio signal can include the phrase "show fixing the chain." The client computing device 104 can display the text 409 from the second input audio signal. The NLP component 114 can parse the second input audio signal to identify keywords, such as "show" in the above example phase. The NLP component 114 can identify that, based on the keyword "show," the use would like to a specific portion of the video component 405. The NLP component 114 can identify that the end user wants to see the portion of the video component 405 that corresponds to the steps in the video of fixing the bike's chain.

The method 300 can include selecting a break point (ACT 314). The data processing system 102 can select the break point from the plurality of break points generated based on the one or more sets of annotations of the digital component. The data processing system 102 can select the break point based on the keyword, term, or semantic representation identified in the second input audio signal. The data processing system 102 can match or associate the keyword, term, or semantic representation with annotations corresponding to each portion of the digital component or each of the plurality of break points.

In the example illustrated in FIG. 4, the user provided the second input audio signal that includes the phrase "show fixing the chain." The second input audio signal can include a request for a specific break point. For example, the client computing device 104 rendered the digital component 407 that presented to the user a plurality of break points. The second input audio signal can identify or be associated with a break point not previously represented to the end user. For example, as illustrated in FIG. 4, the second input audio signal "show fixing the chain" is not a selection of one of the break points: "step 1," "step 2," or "step 3." When the second input audio signal does not include a specific selection of a break point, the data processing system 102 can match or associate the keyword, term, or semantic representation identified in the second input audio signal with annotations corresponding to one of the portions of the digital component or to one of the plurality of break points. For example, the term "chain" can be matched or associated with a portion of the video component 405 in which the annotation component 135 identified a chain as an object in the video or where the text or semantic meaning of the speech in the portion of the video correspond to a chain.

The method 300 can include transmitting a portion of the digital component (ACT 316). The transmitted portion of the digital component can correspond to selected break point. The portion of the digital component can be transmitted to the client computing device 104 with instructions that cause the client computing device 104 to automatically start playing or rending the transmitted portion of the digital component. For example, and referring to FIG. 4, the data processing system 102 can select the break point that corresponds to the starting of the portion that illustrates how to change a chain on a bike. The client data processing system 102 can transmit the selected portion to the data processing system, and the data processing system 102 can begin rendering the portion of the video component that illustrates how to change the chain of the bike. Transmitting a portion of the digital component can also include transmitting an indication of the time associated with the selected break point to the client computing device 104. For example, the client computing device 104 may have previously received the entity of the digital component. When a break point is selected, the time associated with the break point can be transmitted to the client computing device 104 and the client computing device 104 can skip to the time in the video associated with the break point.

FIG. 5 illustrates a block diagram of an example computer system 500. The computer system or computing device 500 can include or be used to implement the system 100, or its components such as the data processing system 102. The data processing system 102 can include an intelligent personal assistant or voice-based digital assistant. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 124. The main memory 515 can also be used for storing position information, temporary variables, or other intermediate information during execution of instructions by the processor 510. The computing system 500 may further include a read-only memory (ROM) 520 or other static storage device coupled to the bus 505 for storing static information and instructions for the processor 510. A storage device 525, such as a solid-state device, magnetic disk or optical disk, can be coupled to the bus 505 to persistently store information and instructions. The storage device 525 can include or be part of the data repository 124.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the data processing system 102, the client computing device 104 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, digital component selector 120, NLP component 114, annotation component 135, parsing component 116, and other data processing system components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 500 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 104 or the digital component provider device 106).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 114 or the digital component selector 120, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. For example, the computing device 104 can generate the packaged data object and forward it to the third-party application when launching the application. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system to control digital components in a voice-activated system, comprising:
    a data processing system comprising one or more processors and a memory, the one or more processors executing a natural language processor component, an annotation component, and a parsing component to:
        receive, by the natural language processor component and via interface of the data processing system, a first input audio signal detected by a sensor at a client computing device;
        parse, by the natural language processor component, the first input audio signal to identify a digital component request in the first input audio signal, the digital component request indicating a first digital component, the first digital component including audiovisual content;
        generate, by the annotation component, a first set of annotations of the first digital component based at least on speech recognized from the audiovisual content in the first digital component;
        identify, by the parsing component, a plurality of break points based on at least the first set of annotations to define a plurality of portions within the audiovisual content of the first digital component;
        receive, by the natural language processor component, a second input audio signal detected by the sensor at the client computing device;
        parse, by the natural language processor component, the second input audio signal to identify a term in the second input audio signal;
        select, by the parsing component, a break point from the plurality of break points based on the term in the second input audio signal and the first set of annotations used to identify the break point;
        identify, by the parsing component, from the plurality of portions within the audiovisual content of the first digital component, a portion corresponding to the break point selected from the plurality of break points; and
        transmit, by the parsing component to the client computing device, the portion identified from the first digital component corresponding to the break point.

2. The system of claim 1, comprising a content selecting component to:
    select a second digital component based on the break point selected from the plurality of break points; and
    transmit the second digital component to the client computing device with the portion of the first digital component corresponding to the break point.

3. The system of claim 1, comprising:
    the annotation component to generate a second set of annotations of the first digital component based on images in the first digital component; and
    the parsing component to identify the plurality of break points based on the second set of annotations.

4. The system of claim 1, comprising:
    the annotation component to generate a second set of annotations of the first digital component based on closed captioning data in the first digital component.

5. The system of claim 1, comprising:
    the annotation component to receive a second set of annotations of the first digital component from a second client computing device; and
    the parsing component to identify the plurality of break points based on the second set of annotations.

6. The system of claim 1, comprising the parsing component to:
    identify a scene transition in the first digital component; and
    identify the plurality of break points based on the scene transition.

7. The system of claim 1, comprising:
    the natural language processor component to:
        receive a third input audio signal detected by the sensor at the client computing device;
        parse the third input audio signal to identify an indication of a second break point of the plurality of break points; and
    the parsing component to transmit, to the client computing device, a second portion of the first digital component corresponding to the second break point.

8. The system of claim 1, comprising:
    the natural language processor component to parse the first input audio signal to identify a first semantic representation in the first input audio signal; and
    the parsing component to select the break point from the plurality of break points based on the first semantic representation.

9. The system of claim 1, comprising the parsing component to:
    generate the plurality of portions of the first digital component based on the plurality of break points; and
    determine a semantic representation for each of the plurality of portions of the first digital component.

10. The system of claim 9, comprising:
    the annotation component to generate a second set of annotations of the first digital component based on the semantic representation for each of the plurality of portions of the first digital component; and
    the parsing component to identify the plurality of break points based on the second set of annotations.

11. The system of claim 1, wherein each of the plurality of break points corresponds to the start of a different scene.

12. The system of claim 1, comprising the parsing component to:
    generate a second digital component comprising an indication of each of the plurality of break points; and transmit the second digital component to the client computing device for presentation with the portion of the first digital component corresponding to the break point.

13. The system of claim 12, comprising:

the natural language processor component to receive from the client computing device, a third input audio signal comprising a selection of one of the plurality of break points; and the parsing component to select the break point from the plurality of break points based on the selection of one of the plurality of break points.

14. A method to control digital components in a voice-activated system, comprising:

receiving, by a natural language processor component executed by a data processing system and via an interface of the data processing system, a first input audio signal detected by a sensor at a client computing device;

parsing, by the natural language processor component, the first input audio signal to identify a digital component request in the first input audio signal, the digital component request indicating a first digital component, the first digital component including audiovisual content;

generating, by an annotation component executed by the data processing system, a first set of annotations of the first digital component based at least on speech recognized from the audiovisual content in the first digital component;

identifying, by a parsing component executed by the data processing system, a plurality of break points based on at least the first set of annotations to define a plurality of portions within the audiovisual content of the first digital component;

receiving, by the natural language processor component, a second input audio signal detected by the sensor at the client computing device;

parsing, by the natural language processor component, the second input audio signal to identify a term in the second input audio signal;

selecting, by the parsing component, a break point from the plurality of break points based on the term in the second input audio signal and the first set of annotations used to identify the break point;

identifying, by the parsing component, from the plurality of portions within the audiovisual content of the first digital component, a portion corresponding to the break point selected from the plurality of break points; and transmitting, by the parsing component to the client computing device, the portion identified from the first digital component corresponding to the break point.

15. The method of claim 14, comprising:

selecting, by a content selection component executed by the data processing system, a second digital component based on the break point selected from the plurality of break points; and transmitting, by the content selection component, the second digital component to the client computing device with the portion of the first digital component corresponding to the break point.

16. The method of claim 14, comprising:

generating, by the annotation component, a second set of annotations of the first digital component based on images in the first digital component; and identifying, by the parsing component, the plurality of break points based on the second set of annotations.

17. The method of claim 14, comprising:

receiving, by the annotation component, a second set of annotations of the first digital component from a second client computing device; and identifying, by the parsing component, the plurality of break points based on the second set of annotations.

18. The method of claim 14, comprising:

receiving, by the natural language processor component, a third input audio signal detected by the sensor at the client computing device;

parsing, by the natural language processor component, the third input audio signal to identify an indication of a second break point of the plurality of break points; and transmitting, by the parsing component to the client computing device, a second portion of the first digital component corresponding to the second break point.

19. The method of claim 14, comprising:

parsing, by the natural language processor component, the first input audio signal to identify a first semantic representation in the first input audio signal; and selecting, by the parsing component, the break point from the plurality of break points based on the first semantic representation.

20. The method of claim 14, comprising:

generating, by the parsing component, a second digital component comprising an indication of each of the plurality of break points;

transmitting, by the parsing component, the second digital component to the client computing device for presentation with the portion of the first digital component corresponding to the break point;

receiving, by the natural language processor component from the client computing device, a third input audio signal comprising a selection of one of the plurality of break points; and selecting, by the parsing component, the break point from the plurality of break points based on the selection of one of the plurality of break points.

* * * * *